United States Patent
Lee et al.

(10) Patent No.: US 11,250,387 B2
(45) Date of Patent: Feb. 15, 2022

(54) SENTENCE ATTENTION MODELING FOR EVENT SCHEDULING VIA ARTIFICIAL INTELLIGENCE AND DIGITAL ASSISTANTS

(71) Applicant: Microsoft Technology Licensing, LLC, Redmond, WA (US)

(72) Inventors: Charles Yin-Che Lee, Mercer Island, WA (US); Pamela Bhattacharya, Redmond, WA (US); Barun Patra, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 509 days.

(21) Appl. No.: 16/206,402

(22) Filed: Nov. 30, 2018

(65) Prior Publication Data

US 2020/0175478 A1 Jun. 4, 2020

(51) Int. Cl.
| | | |
|---|---|---|
| *G06Q 10/00* | (2012.01) | |
| *G06N 20/00* | (2019.01) | |
| *G06F 40/00* | (2020.01) | |
| *G06Q 10/10* | (2012.01) | |
| *G06F 40/284* | (2020.01) | |
| *G06Q 10/06* | (2012.01) | |

(52) U.S. Cl.
CPC ....... *G06Q 10/1095* (2013.01); *G06F 40/284* (2020.01); *G06N 20/00* (2019.01); *G06Q 10/06311* (2013.01); *G06Q 10/107* (2013.01)

(58) Field of Classification Search
CPC ......... G06Q 10/00–50/00; G06N 20/00; G06F 40/00
USPC ............................................... 705/7.11–7.42
See application file for complete search history.

(56) References Cited

U.S. PATENT DOCUMENTS

| | | |
|---|---|---|
| 7,496,500 B2 | 2/2009 | Reed et al. |
| 7,548,895 B2 | 6/2009 | Pulsipher |
| (Continued) | | |

OTHER PUBLICATIONS

Yang, Z., Yang, D., Dyer, C., He, X., Smola, A., & Hovy, E. (Jun. 2016). Hierarchical attention networks for document classification. In Proceedings of the 2016 conference of the North American chapter of the association for computational linguistics: human language technologies (pp. 1480-1489). (Year: 2016).*

(Continued)

*Primary Examiner* — Alan S Miller
*Assistant Examiner* — Mustafa Iqbal

(57) ABSTRACT

In non-limiting examples of the present disclosure, systems, methods and devices for assisting with scheduling a meeting are presented. A message comprising a plurality of sentences may be received. A hierarchical attention model may be utilized to identify a subset of sentences of the plurality of sentences that are relevant to a scheduling of the meeting. A subset of words in the subset of sentences that are potentially relevant to scheduling of the meeting may be identified based on relating to at least one meeting parameter. The subset of words may be split into a first group comprising words from the subset of words that are above a meeting relevance threshold value, and a second group comprising words from the subset of words that are below a meeting relevance threshold value. An automated action associated with scheduling the meeting may be caused to be performed.

20 Claims, 9 Drawing Sheets

(56) References Cited

U.S. PATENT DOCUMENTS

| | | | |
|---|---|---|---|
| 8,768,308 | B2 | 7/2014 | Kim et al. |
| 9,372,851 | B2 | 6/2016 | Hazen et al. |
| 10,453,117 | B1* | 10/2019 | Reavely ............. G06Q 30/0645 |
| 2015/0348551 | A1* | 12/2015 | Gruber .................. G06F 40/205 |
| | | | 704/235 |
| 2017/0285897 | A1 | 10/2017 | Liensberger et al. |
| 2017/0287478 | A1 | 10/2017 | Schulz et al. |
| 2018/0123997 | A1 | 5/2018 | Celedonia et al. |
| 2020/0005247 | A1* | 1/2020 | Randall ................ G06Q 10/107 |

OTHER PUBLICATIONS

Cranshaw, et al., "Calendar.help: Designing a Workflow-Based Scheduling Agent with Humans in the Loop", In Proceedings of CHI Conference on Human Factors in Computing Systems, May 2, 2017, pp. 2382-2393.

Rong, et al., "Managing Uncertainty in Time Expressions for Virtual Assistants", In Proceedings of CHI Conference on Human Factors in Computing Systems, May 2, 2017, pp. 1-12.

"International Search Report and Written Opinion Issued in PCT Application No. PCT/US2019/062888", dated Feb. 5, 2020, 13 Pages.

* cited by examiner

SENTENCE ATTENTION MODELING FOR EVENT SCHEDULING VIA ARTIFICIAL INTELLIGENCE AND DIGITAL ASSISTANTS

BACKGROUND

Digital assistants have become integrated with many parts of personal and business tasks. Users have become accustomed to utilizing digital assistants for obtaining directions, checking the weather, and initiating real-time communications with other persons (e.g., finding a contact to call, initiating a phone or video call). As digital assistants have been given access to email functions, calendars, and contact lists, users have started to utilize their digital assistants for scheduling meetings and appointments with other users. However, users sometimes provide digital assistants with conflicting keywords and phrases in their messages and utterances. These conflicting keywords and phrases can be problematic for digital assistants in identifying a user's intent when it comes to necessary parameters (e.g., time, date, location, attendees, event type) in scheduling meetings and appointments.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with scheduling meetings via digital assistants and application of various artificial intelligence processing models. A first user may generate an electronic message for scheduling a meeting that implicitly or explicitly tags or identifies a digital assistant. A digital assistant service associated with that digital assistant may apply a coarse-grained chunking model to the message to identified potentially relevant meeting parameters in that message. The digital assistant service may further apply a fine-grained chunking model to the sentences, words, and/or phrases in the message that were identified as potentially being relevant to meeting parameters in the message to identify to a high degree of certainty which of those parameters relate to the messaging user's "meeting intent". Once the meeting parameters have been positively identified, the digital assistant service may perform one or more actions that assist with scheduling a meeting corresponding to the messaging user's meeting intent (e.g., the digital assistant service may automatically send a meeting invite to potential meeting attendees utilizing the identified meeting parameters, the digital assistant service may automatically send messages querying attendees for available times and/or dates to hold a meeting, etc.).

BRIEF DESCRIPTION OF THE DRAWINGS

Non-limiting and non-exhaustive examples are described with reference to the following figures.

DETAILED DESCRIPTION

Figure 1:
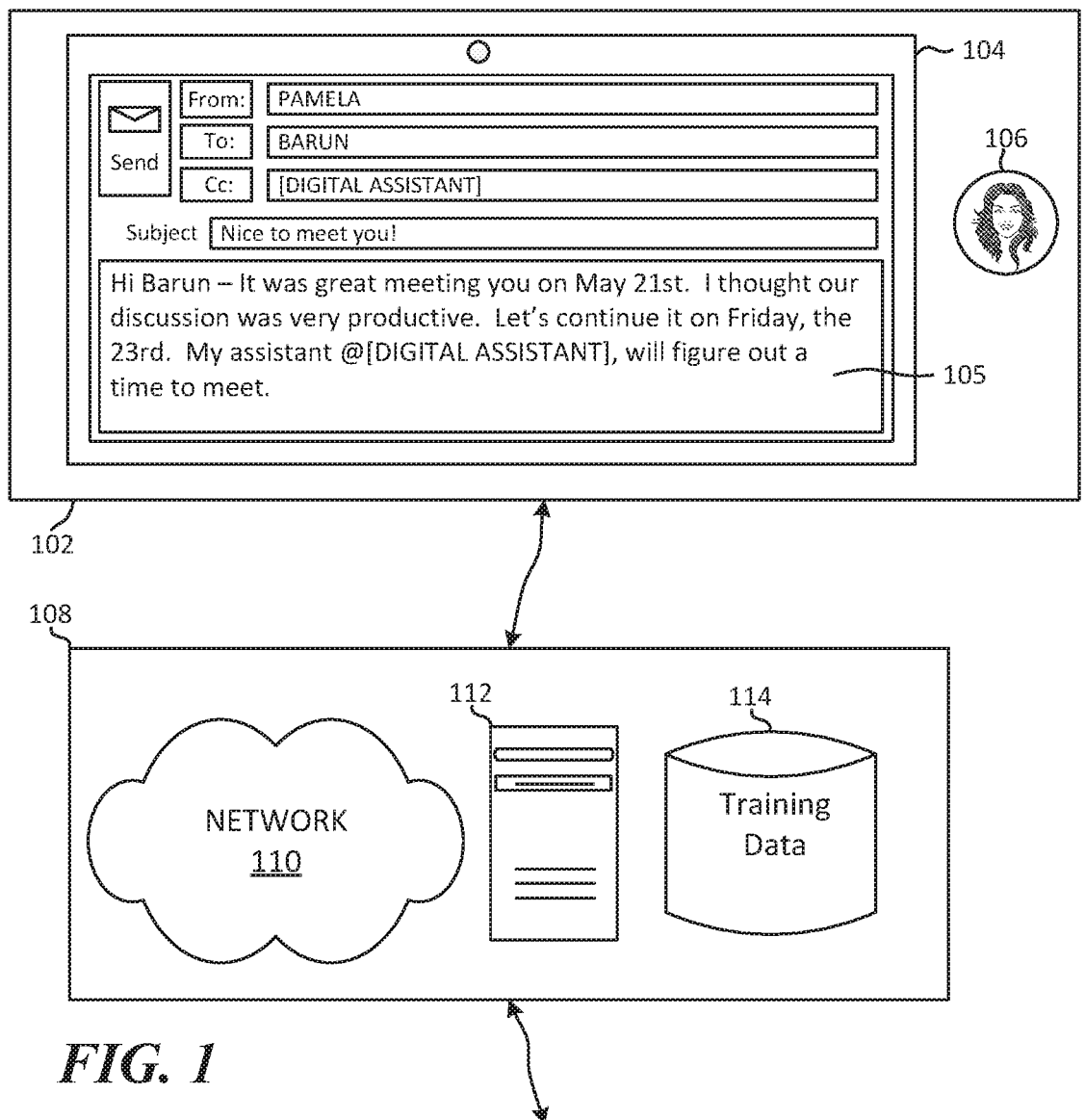
FIG. 1 is a schematic diagram illustrating an example distributed computing environment for utilizing artificial intelligence to identify relevant content and user intent in a message related to scheduling a meeting and assisting with scheduling that meeting via a digital assistant.
Figure 1:
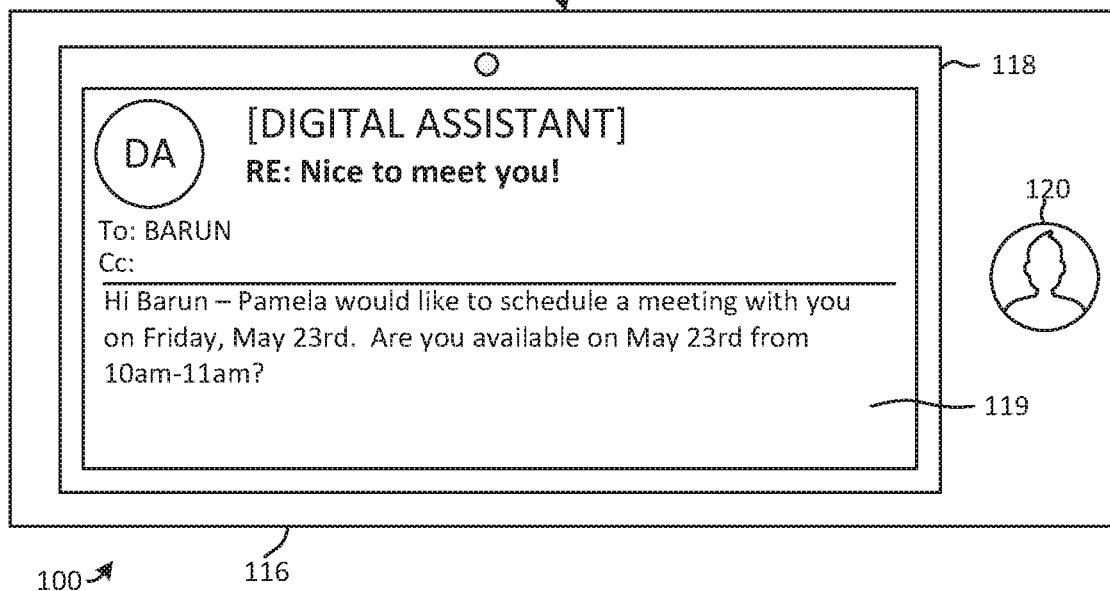

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for utilizing artificial intelligence in association with digital assistants to process natural language inputs associated with events to identify clear user intent. In examples, the natural language inputs may include multiple parameters of a same type (e.g., time, date, location, potential attendees), and in some cases, conflicting parameters. A digital assistant service may process a natural language input utilizing a coarse chunking model, such as a hierarchical attention model, to disambiguate between different possible intents in the natural language input, and further process that natural language input utilizing a fine-grained event tagger, such as a conditional random field model, with long-short term memory feature extractors. In some examples, the conditional random field model may be trained on one or more datasets comprising scheduling utterances. The systems, methods and devices described herein are described primarily in association with an electronic messaging digital assistant and an event scheduling helper. However, the two-model processing approach described herein may also be applied for proactive scheduling intent detection, user-assisted event creation (guided capture), and ambient device digital assistant utterance capture, which if applied in that scenario, provides higher accuracy compared with traditional time expression utterance detection models.

The systems, methods, and devices described herein provide technical advantages for identifying relevant content in electronic messages for utilization in scheduling meetings by digital assistants. Processing costs associated with scheduling group meetings are reduced via the mechanisms described herein due at least to the decreased number of electronic messages that must be sent back and forth between users to identify mutually acceptable meeting parameters (e.g., meeting time, date, location, type, etc.) associated with scheduling of meetings. Additionally, while users would traditionally have to access their own calendars to determine whether they are available at certain times and dates to attend a meeting, the digital assistant service as described herein can automatically perform those actions, further reducing processing costs associated with scheduling meetings. The user experience associated with scheduling meetings is also enhanced via the same mechanisms (e.g., users do not have to waste time identifying mutually convenient times, dates, places, meeting types, etc.). Processing costs are further reduced via the fine and coarse-grained processing models described herein, in that parameters that might otherwise be identified as relating to a user's meeting intent, can more easily and assuredly be ruled out via application of those models. Manual feedback that would otherwise be necessary to rule-out false positives relating to meeting parameters can also be substantially eliminated due to the heightened accuracy provided via the application of multiple models as described herein.

FIG. 1 is a schematic diagram illustrating an example distributed computing environment 100 for utilizing artificial intelligence to identify relevant content and user intent in a message related to scheduling a meeting and assisting with scheduling that meeting via a digital assistant. Computing environment 100 includes electronic message transmission sub-environment 102; network and processing sub-environment 108, which includes a digital assistant service for processing natural language inputs; and electronic message reception sub-environment 116.

In electronic message transmission sub-environment 102 a first user 106, Pamela, has composed an email 105 to a second user 120, Barun, utilizing computing device 104. While email 105 is addressed to second user 120, that message is also addressed to [DIGITAL ASSISTANT] in the carbon copy field. Email 105 states: "Hi Barden—It was great meeting you on May 21st. I thought our discussion was very productive. Let's continue it on Friday, the 23rd. My assistant @[DIGITAL ASSISTANT], will figure out a time to meet."

Once first user 106 sends email 105, that message is routed to network and processing sub-environment 108, and in particular, a digital assistant service associated with network and processing sub-environment 108. Email 105 may be directed to the digital assistant service based on the digital assistant being included in the carbon copy field of email 105 and/or email 105 including the "@[DIGITAL ASSISTANT]" tag in its body. The digital assistant service may be at least partially cloud-based, and operate on one or more server computing devices, such as server computing device 112. Email 105 may be routed to the digital assistant service via network 110, and any of the computing devices described in relation to FIG. 1 may communicate with one another via network 110. In some examples, the digital assistant service may communicate with one or more data stores, such as training data store 114, which may include natural language data sets for training various aspects of a digital assistant.

In this example, the digital assistant service receives the entirety of email 105, including the addressees (in this case second user 120 "Barun" in the "to" field, and itself [DIGITAL ASSISTANT] in the "Cc" field), the subject line "Nice to meet you!", and the text in the body of the email. Although not shown, in examples where the digital assistant service receives an electronic message with other tags, such as designated meeting times, time zones, places, meeting types, etc., the digital assistant may also receive and process that information. In some examples, the digital assistant service may analyze received email 105 and determine whether there is a specific command in the that message that it should respond to (e.g., "schedule meeting", "add to my calendar", etc.). In this example, there is no direct command. However, the digital assistant service may process the text with a natural language processing engine and determine that the text "My assistant @[DIGITAL ASSISTANT], will figure out a time to meet" is a command to schedule a meeting for the first user based on information in email 105.

Upon determining that email 105 contains a command to the digital assistant to help schedule/organize a meeting, the digital assistant service may perform a two-step processing of the text in the body of the message to determine one or more intents associated with the command. While the specifics of the processing are set forth in more detail in relation to FIG. 2 and FIG. 3, at a basic level, the digital assistant service performs a first, coarse level natural language processing on the text in email 105, and a second, fine-grained natural language processing on the text in email 105. The coarse level processing may be performed to identify which sentences, and aspects thereof, are relevant to the received command (i.e., the command to assist with scheduling of a meeting), and the fine-grained processing may be performed to disambiguate between entities relevant to scheduling of the meeting. That is, the coarse level processing may identify sentences in the received text that include one or more potential meeting parameters (e.g., time, place, attendees), and the fine-grained processing may identify whether one or more of those sentences and/or meeting parameters are false positives (e.g., whether a sentence that includes a meeting parameter is not relevant to the received command to assist with scheduling of a new meeting, whether a perceived meeting parameter is not relevant to the received command to assist with scheduling of a new meeting).

According to some examples, the coarse level processing may comprise processing of the text utilizing a hierarchical attention model, and the second level processing may comprise a conditional random field model, with long short-term feature extractors. In additional examples, one or more of the following may be applied to a received message in performing coarse and/or fine-grained processing of that message to assist with meeting scheduling: topic detection using clustering, hidden Markov models, maximum entropy Markov models, support vector machine models, decision tree models, deep neural network models, general sequence-to-sequence models (e.g., conditional probability recurrent neural networks, transformer networks), generative models, recurrent neural networks for feature extractors (e.g., long short-term memory models, GRU models), deep neural network models for word-by-word classification, and latent variable graphical models).

In this example, based on processing of the text from email 105, the digital assistant service has identified that the first user 106 "Pamela" would like to schedule a meeting with the second user 120 "Barun". The digital assistant service may have also utilized the "to" field in making this determination (i.e., "BARUN" is included in the "to" field). The digital assistant service has also determined that although there are multiple dates included in the body of email 105, the date that is relevant to the scheduling of the new meeting is "Friday, the 23rd". As such, the digital assistant service automatically generates and sends email 119 to the second user 120, which second user 120 may view via computing device 118. Email 119 from the digital assistant states: "Hi Barun—Pamela would like to schedule a meeting with you on Friday, May 23rd. Are you available on May 23rd from 10 am-11 am?". Although in this example the digital assistant service is asking the second user 120 "Barun" whether he is available to meet during specific hours on the proposed meeting date (May 23rd), if the digital assistant service has access to the second user's 120 calendar, in some examples, it might be able to bypass this step and automatically generate a meeting, invite for a mutually available timeframe on the proposed meeting date. Additional details regarding processing of email 105 by the digital assistant service are provided in relation to FIG. 2 below.

Figure 2:
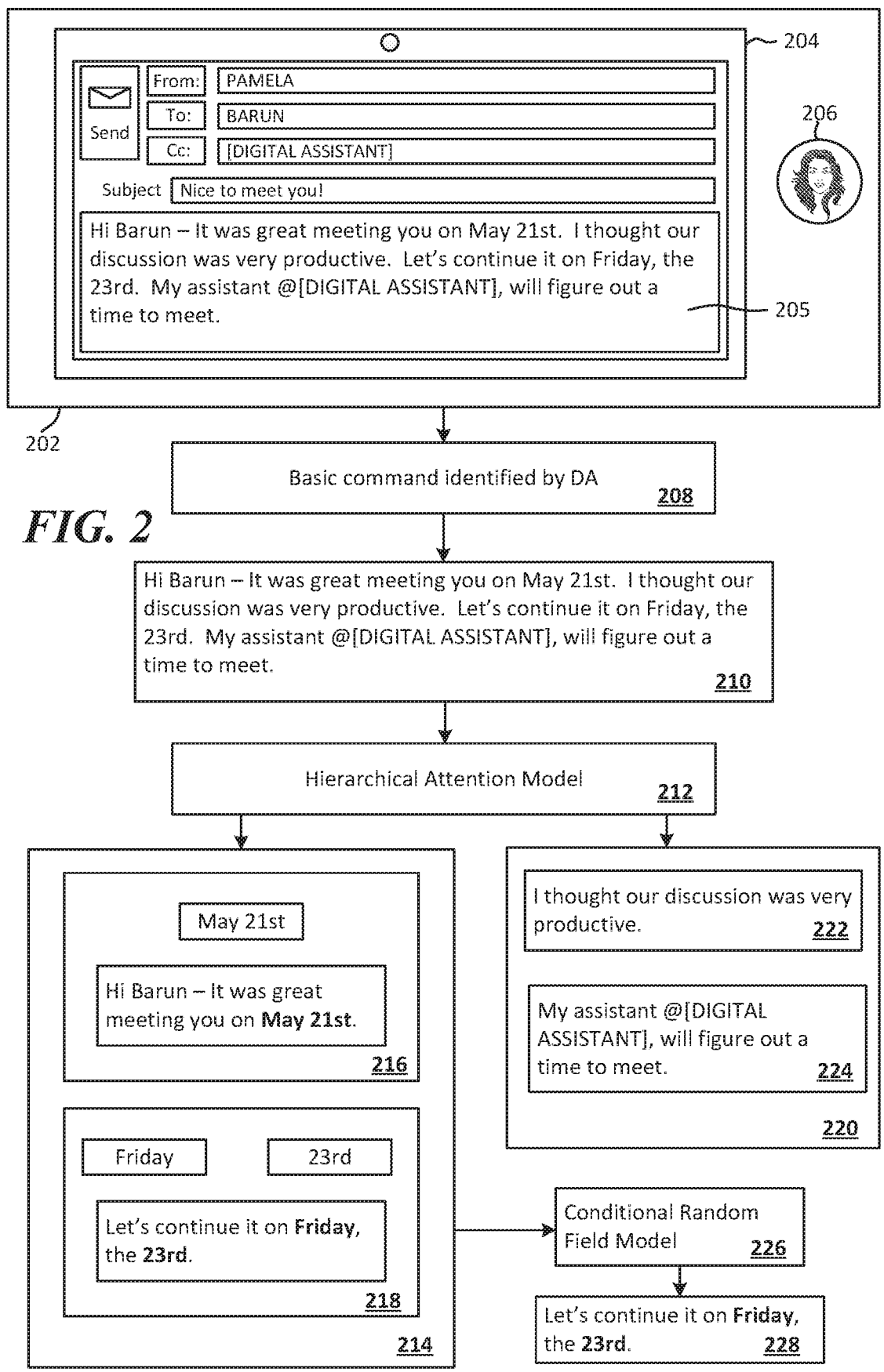
FIG. 2 illustrates processing of an electronic message by a digital assistant service to assist with scheduling a meeting.

FIG. 2 illustrates processing of an email 205 by a digital assistant service to assist with scheduling a meeting. Email 205 is the same email as email 105 discussed in relation to FIG. 1. All of the steps and elements shown in FIG. 2, except those in electronic message transmission sub-environment 202, are illustrative of processing steps and elements that may be performed by a digital assistant service in processing electronic messages and/or utterances.

Email 205 composed by first user 206 "Pamela" has been transmitted to a digital assistant service that may help users schedule meetings and events. In some examples, email 205 may be transmitted to the digital assistant service based on email 205 including the digital assistant in the carbon copy line and/or including the "@[DIGITAL ASSISTANT]" tag in the body of email 205. Regardless, once received by the digital assistant service, the service first determines whether there is a command specified in email 205. In this example, the digital assistant service has identified that the first user 206 would like to have the digital assistant service assist with scheduling of a meeting, as indicated at element 208 "basic command identified by DA".

Once the digital assistant service has identified the basic command associated with email 205, it can process text and/or other data (e.g., tags, explicit meeting parameters, etc.) associated with email 205. In this example, although not shown, the digital assistant service may identify users that email 205 is addressed to in the "To" and "Cc" fields of that email. As shown in relation to element 210, the digital assistant service may also analyze the text in the body of the email. In this example, as with the example in FIG. 1, the text of email 205 states: "Hi Barun—It was great meeting you on May 21st. I thought our discussion was very productive. Let's continue it on Friday, the 23rd. My assistant @[DIGITAL ASSISTANT], will figure out a time to meet."

When the digital assistant service extracts the text from the body of email 205, it may process that text with a hierarchical attention model, as illustrated by element 212. For example, each sentence from the body of email 205 may be broken into its corresponding words, a word encoder may be applied to each word for each sentence, and a resulting vector for each sentence may be determined based on those encodings. Once the hierarchical attention model is sufficiently trained, it may be utilized to identify, by the digital assistant service, each sentence from the email text that is potentially related to a "schedule meeting" intent. The hierarchical attention model may be trained with training data obtained from a set of manually tagged sentences and/or emails, which may be stored in a store, such as training data store 114 in FIG. 1.

The hierarchical attention model, when applied to the text of email 205, has split that text into a first set of sentences that meet a minimum threshold value for relating to a "schedule meeting" intent, and a second set of sentences that do not meet that minimum threshold value. In this example, the first set of sentences (sentences that do meet the minimum threshold value for relating to a "schedule meeting" intent) are shown in relation to element 214, and the second set of sentences (sentences that do not meet the minimum threshold value for relating to a "schedule meeting" intent) are shown in relation to element 220. For example, sentence 216 "Hi Barun—It was great meeting you on May 21st" may have a relatively high encoding score (i.e., high enough to meet the minimum threshold value) based on including two potential meeting parameter words/terms, each of which has its own encoding score based on the application of the hierarchical attention model. Those two words/terms are "Barun", potentially relating to a meeting attendee, and "May 21st", potentially relating to a meeting date. Similarly, sentence 218 "Let's continue it on Friday, the 23rd" may have a relatively high encoding score (high enough to meet the minimum threshold value) based on including two potential meeting parameter words/terms, each of which has its own encoding score based on the application of the hierarchical attention model. Those two words/terms are "Friday", potentially relating to a meeting day, and "23rd", potentially relating to a meeting date.

Alternatively, as shown in relation to element 220, sentence 222 "I thought our discussion was very productive", and sentence 224 "My assistant @[DIGITAL ASSISTANT], will try to figure out a time to meet", when run through the hierarchical attention model, may have relatively low encoding scores, as there are no words with high encoding scores in either of those sentences related to meeting parameters. As such, sentence 222 and sentence 224 can be filtered from further processing by the digital assistant service for the purposes of assisting with scheduling of the meeting.

Because sentence 216 and sentence 214 both have met a minimum threshold value associated with the hierarchical attention model, a conditional random field model is applied to both of those sentences, as illustrated by element 226. Although a conditional random field model is utilized in this example, other models (e.g., a topic detection clustering model; a statistical Markov model; a supervised learning model; a decision tree; a deep neural network model; a general sequence-to-sequence model; a generative model; a recurrent neural network model; a latent variable graphical model) may additionally or alternatively be applied for determining whether sentence 216, words/terms in sentence 216, sentence 218, and/or words/terms in sentence 218 likely relate to the first user 206's "schedule meeting" intent. Like with the hierarchical attention model, the conditional random field model may be trained on a dataset that has been manually tagged. The conditional random field model acts as a more specific filter than the hierarchical attention model, in that it is specifically trained to identify words and sentences that relate to the specific intent to schedule the meeting that a user has instructed the digital assistant to assist with, while differentiating those words and sentences from other words and sentences in analyzed text that may "look" like meeting parameters (e.g., time, place, attendees), but which nonetheless do not directly relate to the user's "schedule meeting" intent.

In this example, the conditional random field model, when applied to sentence 216 and sentence 218, has identified that sentence 218 and the words/terms "Friday" and "23rd" relate to the user's "schedule meeting" intent, as illustrated by element 228, and that sentence 216 does not directly relate to the user's "schedule meeting" intent. However, the conditional random field model does not necessarily identify only entire sentences and words in those sentences as being related to a "schedule meeting" intent. That is, while not the case here, the conditional random field model may identify words in either or both of sentences 216 and 218 that have a high degree of likelihood of relating to the "schedule meeting" intent. Thus, a percentage and/or likelihood that each word, term, and/or sentence in each of sentences 216 and 218 relates to first user 206's "schedule meeting" intent may be determined by the digital assistant service, via the conditional random field model. The digital assistant service may then utilize a threshold associated with that percentage and/or likelihood for determining which parameters to include in its follow-up actions in assisting with scheduling of the meeting.

Figure 3:
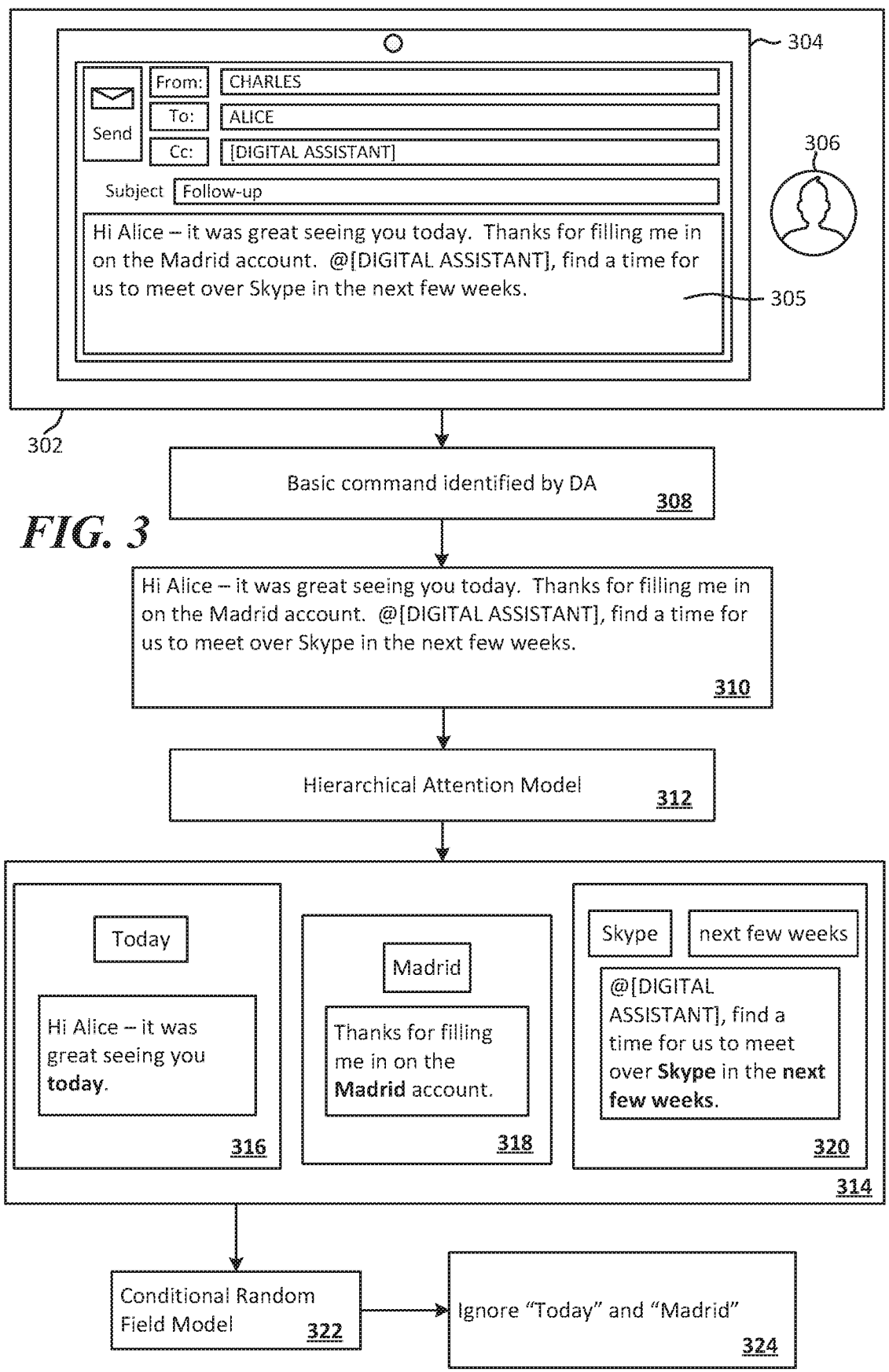
FIG. 3 illustrates processing of another electronic message by a digital assistant service to assist with scheduling another meeting.

FIG. 3 illustrates processing of another email 305 by a digital assistant service to assist with scheduling another meeting. Email 305, which is displayed on computing device 304, has been drafted by first user 306 "Charles". That email includes second user "Alice" in the "To" field, and the digital assistant "[DIGITAL ASSISTANT]" in the "Cc" field, Email 305 states, in its body: "Hi Alice—it was great seeing you today. Thanks for filling me in on the Madrid account. @[DIGITAL ASSISTANT], find a time for us to meet over Skype in the next few weeks." All of the steps and elements shown in FIG. 3, except those in electronic message transmission sub-environment 302, are illustrative of processing steps elements that may be performed by a digital assistant service in processing electronic messages and/or utterances. For example, the processing steps described herein may be performed by one or more server computing devices, such as server computing device 112, which may host a digital assistant service.

Email 305 composed by first user 306 "Charles" has been transmitted to a digital assistant service that may help users schedule meetings and events. In some examples, email 305 may be transmitted to the digital assistant service based on email 305 including the digital assistant in the carbon copy field and/or including the "@[DIGITAL ASSISTANT]" tag in the body of email 305. Regardless, once received by the digital assistant service, the service may first determine whether there is a command specified in email 305. In this example, the digital assistant service has identified that the first user 306 would like to have the digital assistant service assist with scheduling of a meeting, as indicated at element 308 "basic command identified by DA".

Once the digital assistant service has identified the basic command associated with email 305, it can process text and/or other data associated with email 305. In this example, although not shown, the digital assistant service may identify users that email 305 is addressed to in the "To" and "Cc" fields of that email. As shown in relation to element 310, the digital assistant service may also analyze the text in the body of the email.

When the digital assistant service extracts the text from the body of email 305, it may process that text with a hierarchical attention model, as illustrated by element 312. For example, each sentence from the body of email 305 may be broken into its corresponding words, a word encoder may be applied to each word for each sentence, and a resulting vector for each sentence may be determined based on those encodings. Once the hierarchical attention model is sufficiently trained, it may identify each sentence, to a degree of certainty, that is related to a "schedule meeting" intent. The hierarchical attention model may be trained with training data obtained from a set of manually tagged sentences and/or emails, which may be stored in a store, such as training data store 114 in FIG. 1.

When applied to the text of email 305, the hierarchical attention model may calculate a value for each word/term and sentence corresponding to a likelihood that each word/term and sentence corresponds to a "schedule meeting" intent of first user 306. For exemplary purposes, in element 314, the words "Alice" (a potential meeting attendee) and "today" (a potential meeting date) have been highlighted from sentence 316 as potentially relating to the "schedule meeting" intent based on the values calculated for them via application of the hierarchical attention model; the word "Madrid" (a potential meeting location) has been highlighted from sentence 318 as potentially relating to the "schedule meeting" intent based on its calculated value; and the word "Skype" (a potential meeting type), and the phrase "next few weeks" (potential meeting date window) have been highlighted from sentence 320 as potentially relating to the "schedule meeting" intent based on their calculated values. Thus, each of those words, phrases, and/or sentences may have a relatively high encoding score associated with it. As such, the digital assistant service may pass each of those words, phrases, and/or sentences along for processing through application of a conditional random field model.

Thus, each of the words, phrases and sentences illustrated in element 314 have a conditional random field model applied to them, as illustrated by element 322. Although a conditional random field model is utilized in this example, other models (e.g., a topic detection clustering model; a statistical Markov model; a supervised learning model; a decision tree; a deep neural network model; a general sequence-to-sequence model; a generative model; a recurrent neural network model; a latent variable graphical model) may additionally or alternatively be applied for determining whether words/terms in sentences 316, 318 and/or 320 likely relate to first user 306's "schedule meeting" intent. Like with the hierarchical attention model, the conditional random field model may be trained on a dataset that has been manually trained and tagged. The conditional random field model acts as a more specific filter than the hierarchical attention model, in that it is specifically trained to identify words and sentences that relate to the specific intent to schedule the meeting that a user has instructed the digital assistant to assist with, while differentiating those words and sentences from other words and sentences in analyzed text that may "look" like meeting parameters (e.g., time, place, attendees), but which nonetheless do not directly relate to the user's "schedule meeting" intent.

In this example, the digital assistant service makes the determination that, based on values associated with the words/terms and/or sentences corresponding to sentences 316, 318 and 320, which have been calculated based on application of the conditional random field model, the words "today" and "Madrid" should be ignored for scheduling purposes as indicated by element 324, and the words "Alice" (a meeting attendee), "Skype" (a meeting type), and "next few weeks" (a date range when the meeting should be scheduled) correspond to first user 306's "schedule meeting" intent.

In some examples, developers may manually set and/or adjust a threshold value and/or percentage that must be met by each word/term corresponding to a meeting parameter for that word/term to be positively indicated (and therefore utilized by the digital assistant service for assisting with scheduling a corresponding meeting) as being associated with a user's "schedule meeting" intent. For example, a developer may set an initial percentage threshold (calculated by a conditional random field model) for a word/term to be positively indicated as being associated with a user's "schedule meeting" intent in order for the digital assistant service to utilize the corresponding parameter in performing scheduling assistance actions, and the developer may adjust that percentage depending on whether the results appear to be satisfactory. For example, if the digital assistant service is not able to identify sufficient meeting parameters in a high percentage of use cases, the developer may lower the threshold from 90% to 80%, and if the digital assistant service is including too many false positive parameters in a high percentage of use cases, the developer may raise the threshold from 90% to 95%.

Figure 4:
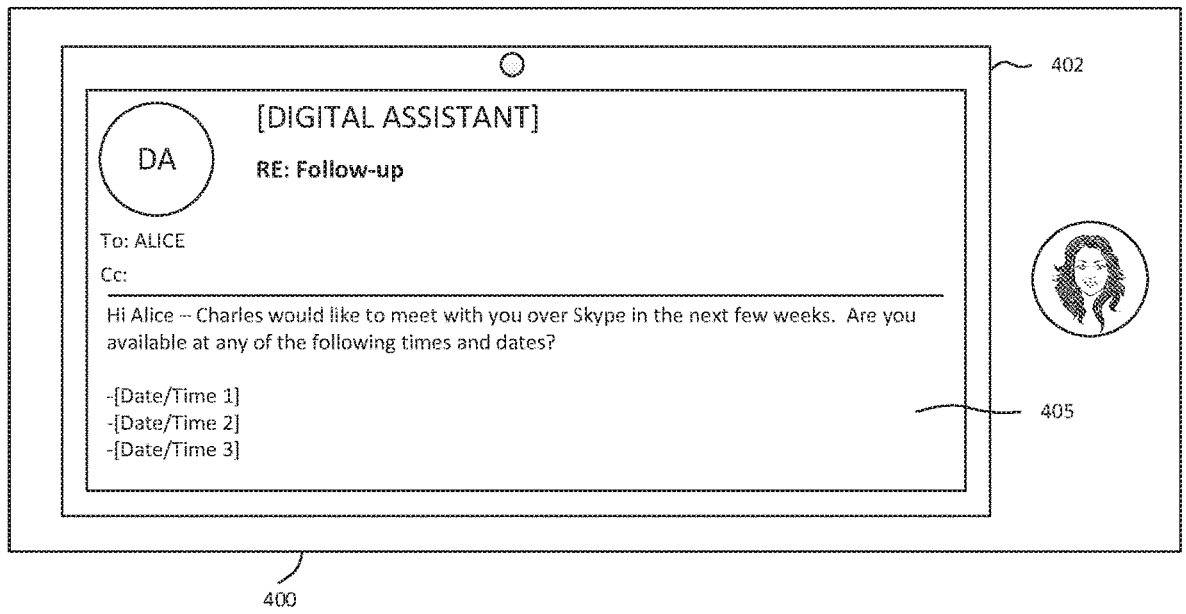
FIG. 4 is an exemplary email that a digital assistant may generate and send to assist with scheduling a meeting based on processing of a message related to scheduling of that meeting.

FIG. 4 illustrates an exemplary email 405 that a digital assistant may generate and send to assist with scheduling a meeting based on processing of a message related to scheduling of that meeting. Email 405, displayed on computing device 402 in electronic message reception environment 400, has been generated based on the processing of email 305 that the digital assistant service performed as described in relation to FIG. 3 above. Specifically, the digital assistant service has determined, via application of the hierarchical attention model and conditional random field model to the text of email 305, that meeting parameters that are relevant to Charles' "schedule meeting" intent are "Skype" (a meeting type), and "next few weeks" (a date range when the meeting is to take place). The digital assistant service may also determine based on its analysis that Alice is a potential meeting attendee. Additionally, the digital assistant service has determined that the parameters "today" and "Madrid" should be ignored based on the application of the two models. In some examples, values calculated for the parameters "today" and "Madrid" via the conditional random field model may have fallen below a threshold for utilization in providing meeting assistance by the digital assistant, and values calculated for the parameters "Skype", and "next few weeks" may have met or exceeded that threshold. As such, the digital assistant service has sent an email to Alice that states: "Hi Alice—Charles would like to meet with you over Skype in the next few weeks. Are you available at any of the following times and dates? —[Date/Time 1]—[Date/Time 2]—[Date/Time: 3]". Although not shown, each of the three dates/times may correspond to dates and times that fall within the "next few weeks", corresponding to the "date range when the meeting is to take place" parameter identified as being relevant to the user's schedule meeting intent. Additionally, the meeting has been listed as a Skype meeting, corresponding to the "meeting type" parameter identified as being relevant to the user's "schedule meeting" intent.

Figure 5:
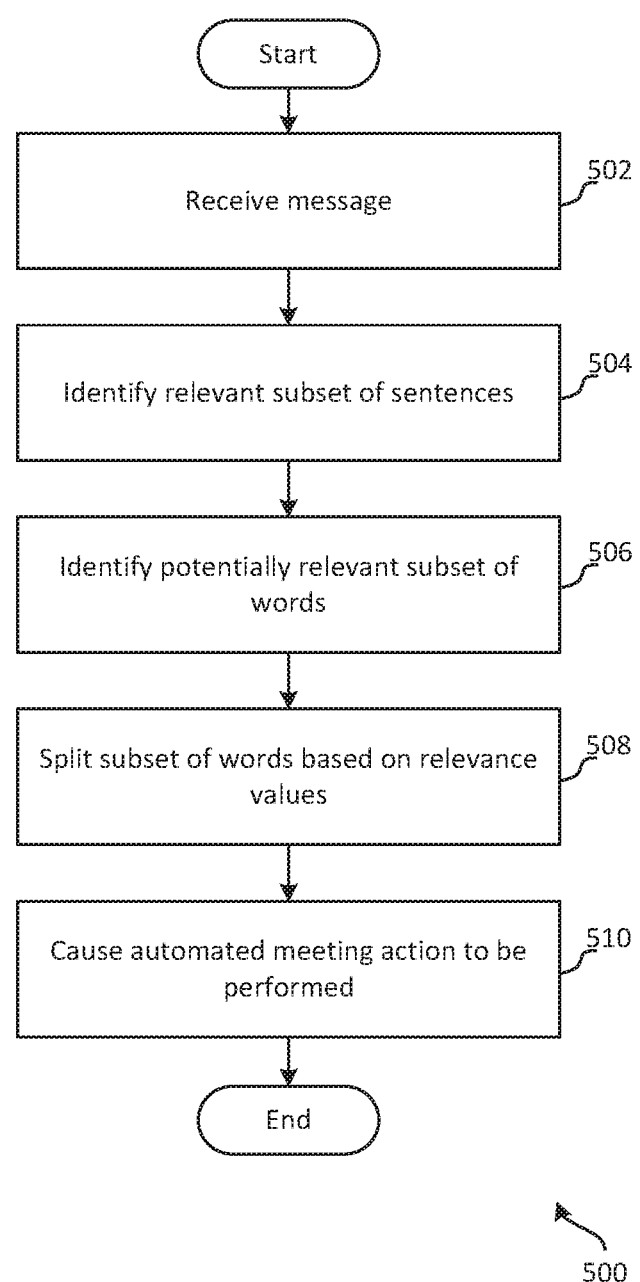
FIG. 5 is an exemplary method for assisting with scheduling a meeting via processing of a message by a digital assistant service.

FIG. 5 is an exemplary method 500 for assisting with scheduling a meeting via processing of a message by a digital assistant service. The method 500 begins at a start operation and moves to operation 502 where a message comprising a plurality of sentences is received. Although a plurality of sentences is used for purposes of this example, operation 502 may alternatively be performed on a message comprising one sentence. In some examples, one or more of the plurality of sentences may include an explicit or implied request to have a digital assistant associated with the digital assistant service assist with scheduling of a meeting. For example, a user may add a digital assistant in the "to" and/or "cc" fields of the message and/or a user may include a digital assistant, or reference to a digital assistant, in the body of the message. In additional examples, the message may be manually tagged with a request to have the digital assistant assist with scheduling of a meeting (e.g., a user may choose a selectable option for directing the message to a digital assistant service, a messaging account may automatically route messages to a digital assistant service for processing).

From operation 502 flow continues to operation 504 where a subset of sentences of the plurality of sentences that are relevant to scheduling of the meeting are identified. The subset of sentences may be identified as being relevant to scheduling of the meeting based on scores and/or values that have been calculated for those sentences based on application of a hierarchical attention model to each of those sentences. The model applied at operation 504 is a coarse chunking model applied to the plurality of sentences to disambiguate between different possible intents of the user that drafted the message. Application of the hierarchical attention model to the plurality of sentences may comprise separating each of the sentences into its corresponding words, applying a word encoder to each of those words, and identifying a vector for each sentence based on those encodings.

From operation 504 flow continues to operation 506 where a subset of words in the subset of sentences that are potentially relevant to scheduling of the meeting are identified based on relating to at least one meeting parameter. The subset of words may be identified as being relevant to scheduling of the meeting based on scores and/or values that have been calculated for those words based on application of a second-level processing model that is a more fine-grained model than the model applied at operation 504. The model applied at operation 506 may comprise a fine-grained event tagger, such as a conditional random field model, with long short-term memory feature extractors. In some examples, the model applied at operation 506 may be trained on one or more datasets of scheduling messages and/or utterances.

Although the coarse-grained model applied at operation 504 is described primarily as a hierarchical attention model, and the fine-grained model applied at operation 506 is described primarily as a conditional random field model, other models may be utilized (e.g., top detection using clustering, hidden Markov models, maximum entropy Markov models, support vector machine models, decision tree models, deep neural network models, general sequence-to-sequence models (e.g., conditional probability recurrent neural networks, transformer networks), generative models, recurrent neural networks for feature extractors (e.g., long short-term memory models, GRU models), deep neural network models for word-by-word classification, and latent variable graphical models).

From operation 506 flow continues to operation 508 where the subset of words is split, based on the fine-grained model applied at operation 506, into a first group comprising words from the subset of words that are above a meeting relevance threshold value, and a second group comprising words from the subset of words that are below a meeting relevance threshold value. In some examples, the type of fine-grained model applied to the subset of words at operation 506 may determine the threshold value at which the first and second group are split at. For example, if the fine-grained model has a relatively higher error rate associated with it, the threshold value may be relatively lower than if the fine-grained model has a relatively lower error rate associated with it.

From operation 508 flow continues to operation 510 where an automated action associated with scheduling the meeting is caused to be performed. In examples, the automated action may include at least one meeting parameter from one of the words of the first group of words split at operation 508. In examples, the automated action may be a meeting request sent to one or more potential attendees of a meeting that the digital assistant service has determined the message sender would like to have scheduled, a query to one or more potential attendees of a meeting for confirming potential times and/or dates for holding a meeting that the digital assistant service has determined the message sender would like to have scheduled, etc.

From operation 510 flow continues to an end operation and the method 500 ends.

Figure 6:
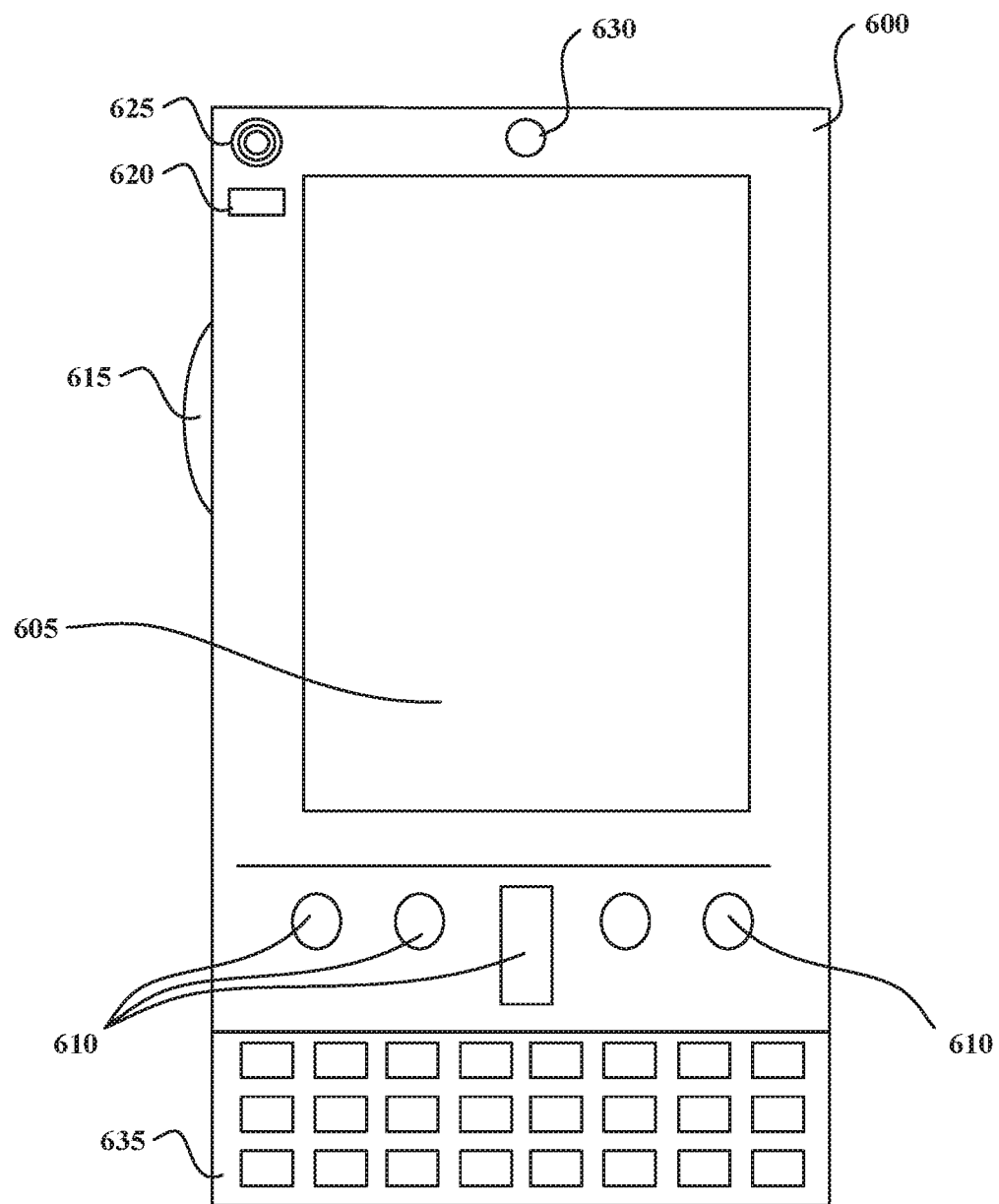
FIGS. 6 and 7 are simplified diagrams of a mobile computing device with which aspects of the disclosure may be practiced.
Figure 7:
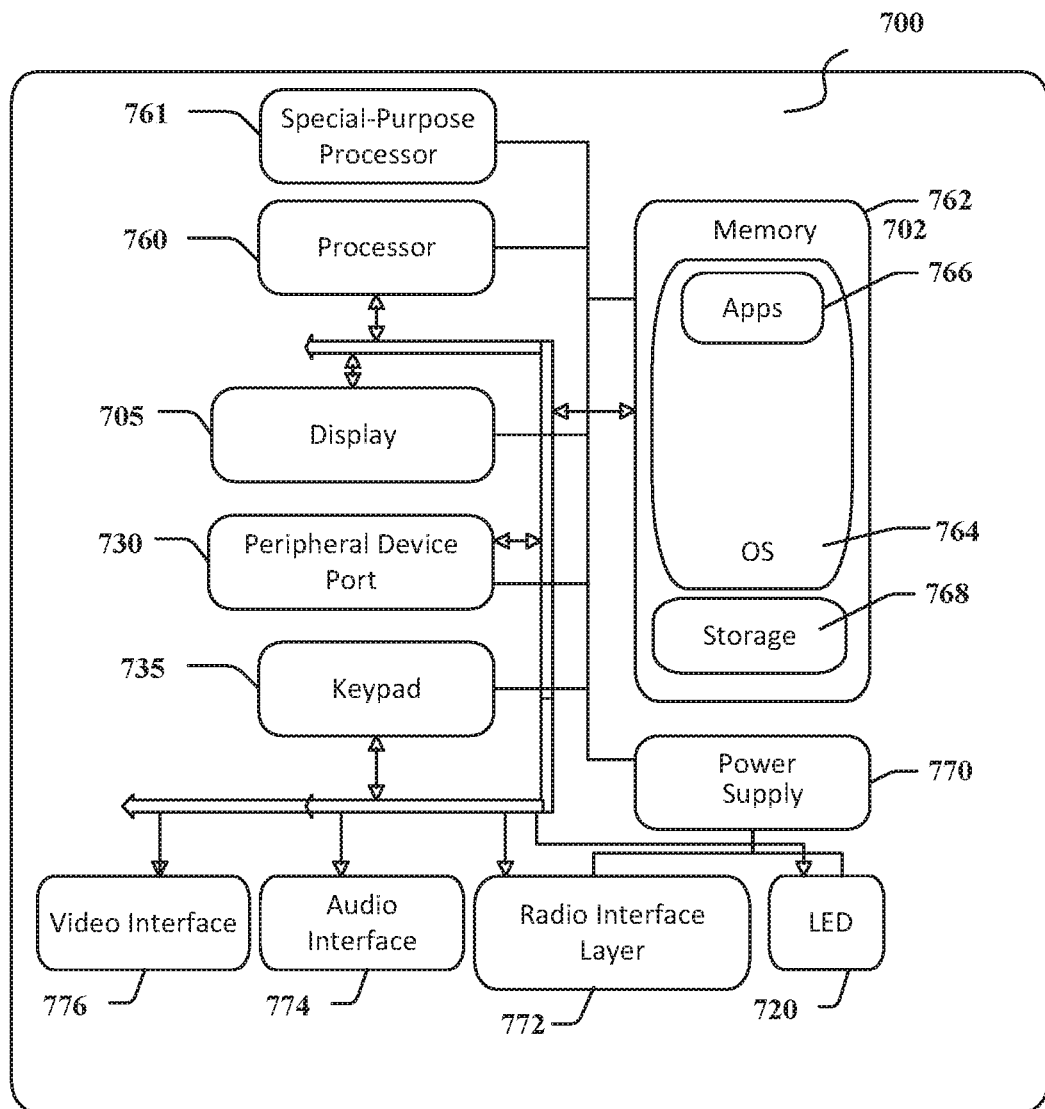

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (FDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape.

Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
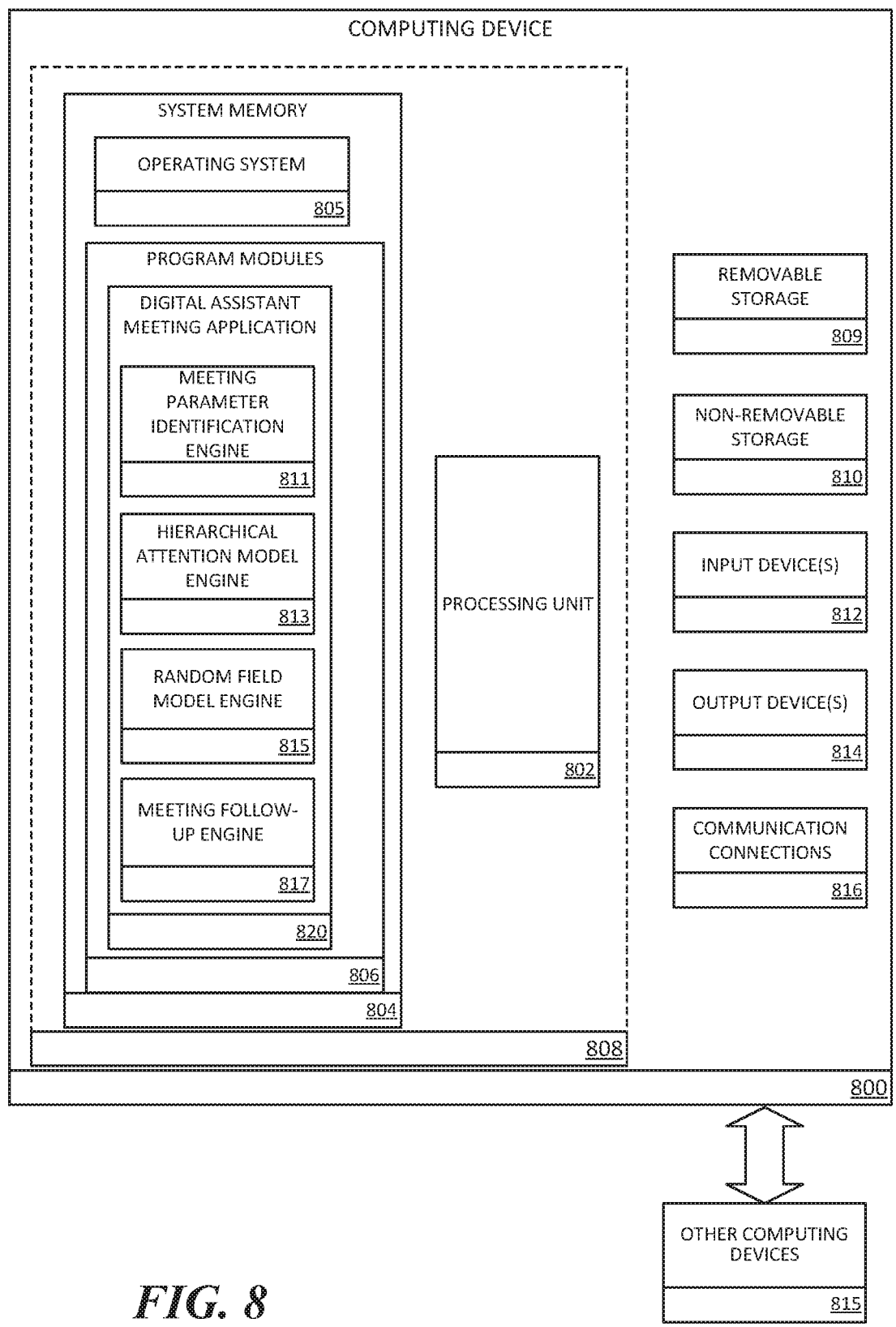
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with scheduling a meeting. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more digital assistant programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., digital assistant meeting application 820) may perform processes including, but not limited to, the aspects, as described herein. According to examples, the meeting parameter identification engine 811 may perform one or more operations associated with identifying meeting parameters (e.g., time, place, date, location, type) in a message. Hierarchical attention model engine 813 may perform one or more operations associated with assigning weights and/or values to words and sentences in a message to identify potential meeting parameters in that message. Random field model engine 815 may perform one or more operations associated with fine-grained identification of meeting parameters from a message (e.g., ruling out false positives from the hierarchical attention model processing). Meeting follow-up engine 817 may automatically perform, by a digital assistant service, one or more follow-up actions associated with scheduling a meeting based on parameters identified via coarse and fine-grained processing by a digital assistant service on one or more messages.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
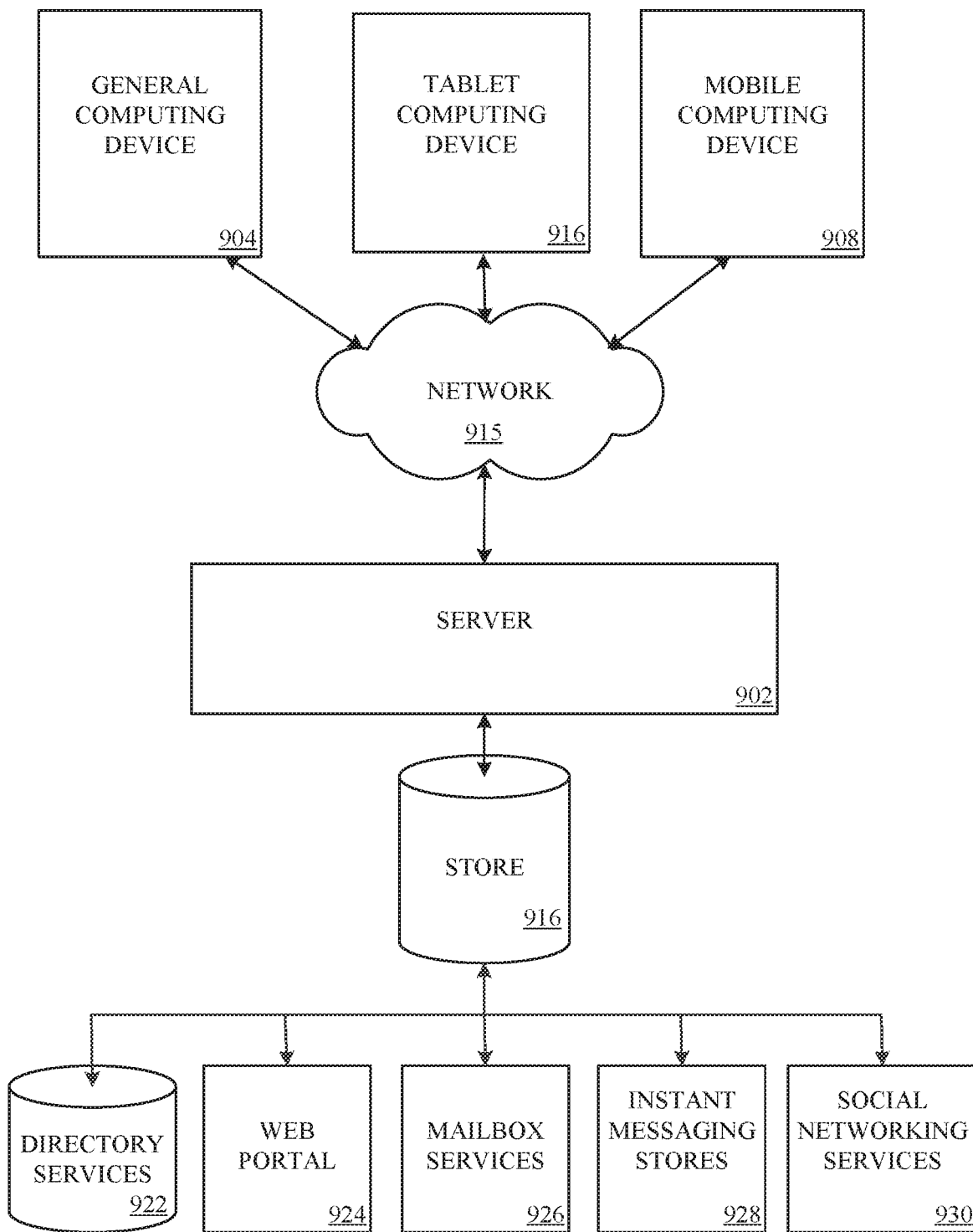
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by, server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for assisting with scheduling a meeting, the method comprising:
   receiving, by a digital assistant service, an electronic message comprising a plurality of sentences;
   extracting, by the digital assistant service, each of the plurality of sentences from the electronic message;
   transforming, by the digital assistant service, each word in each of the plurality of sentences into word encodings utilizing a course-grained processing model comprising a hierarchical attention model;
   generating, by the digital assistant service, from the word encodings, sentence vectors for each of the plurality of sentences utilizing the course-grained processing model;
   identifying, by the digital assistant service utilizing the coarse-grained processing model, a first sentence and a second sentence of the plurality of sentences that are relevant to a schedule meeting intent based on the first sentence having a first vector encoding score above a threshold value and the second sentence having a second vector encoding score above the threshold value;
   filtering, by the digital assistant service, a third sentence of the plurality of sentences from further processing based on the third sentence having a third vector encoding score below the threshold value;
   identifying, by the digital assistant service utilizing a fine-grained processing model, a subset of words in the first sentence and the second sentence that are potentially relevant to scheduling of the meeting based on relating to at least one meeting parameter;
   splitting, by the digital assistant service utilizing the fine-grained processing model, the subset of words into a first group comprising words from the subset of words that are above a meeting relevance threshold value, and a second group comprising words from the subset of words that are below a meeting relevance threshold value; and
   causing, by the digital assistant service, an automated action associated with scheduling the meeting to be performed, wherein the automated action includes at least one meeting parameter from one of the words of the first group of words.

2. The method of claim 1, wherein causing the automated action to be performed comprises causing an automated message for scheduling the meeting to be sent to a party associated with the meeting.

3. The method of claim 1, wherein causing the automated action to be performed comprises causing a prompt to be surfaced in the electronic message, the prompt selectable for sending a meeting invite to a party associated with the meeting.

4. The method of claim 1, wherein the at least one parameter comprises one or more of: a potential attendee of the meeting, a meeting type for the meeting, a duration of the meeting, a location where the meeting is to take place, a time zone associated with the meeting, and a time when the meeting is to take place.

5. The method of claim 1, wherein the fine-grained processing model comprises a conditional random field model.

6. The method of claim 5, wherein the conditional random field model comprises long short-term memory feature extraction.

7. The method of claim 1, wherein the fine-grained processing model comprises at least one of: a topic detection clustering model; a statistical Markov model; a supervised learning model; a decision tree; a deep neural network model; a general sequence-to-sequence model; a generative model; a recurrent neural network model; and a latent variable graphical model.

8. A system for assisting with scheduling a meeting, comprising:
a memory for storing executable program code; and
one or more processors, functionally coupled to the memory, the one or more processors being responsive to computer-executable instructions contained in the program code and operative to:
receive, by a digital assistant service, an electronic message comprising a plurality of sentences;
extract, by the digital assistant service, each of the plurality of sentences from the electronic message;
transform, by the digital assistant service, each word in each of the plurality of sentences into word encodings utilizing a course-grained processing model comprising a hierarchical attention model;
generate, by the digital assistant service, from the word encodings, sentence vectors for each of the plurality of sentences utilizing the course-grained processing model;
identify, by the digital assistant service utilizing the coarse-grained processing model, a first sentence and a second sentence of the plurality of sentences that are relevant to a schedule meeting intent based on the first sentence having a first vector encoding score above a threshold value and the second sentence having a second vector encoding score above the threshold value;
filter, by the digital assistant service, a third sentence of the plurality of sentences from further processing based on the third sentence having a third vector encoding score below the threshold value;
identify, by the digital assistant service utilizing a fine-grained processing model, a subset of words in the first sentence and the second sentence that are potentially relevant to scheduling of the meeting based on relating to at least one meeting parameter;
split, by the digital assistant service utilizing the fine-grained processing model, the subset of words in a first group comprising words from the subset of words that are above a meeting relevance threshold value, and a second group comprising words from the subset of words that are below a meeting relevance threshold value; and
cause, by the digital assistant service, an automated action associated with scheduling the meeting to be performed, wherein the automated action is associated with at least one meeting parameter from one of the words of the first group of words.

9. The system of claim 8, wherein in causing the automated action to be performed, the one or more processors are further responsive to the computer-executable instructions contained in the program code and operative to:
cause an automated message for scheduling the meeting to be sent to a party associated with the meeting.

10. The system of claim 8, wherein in causing the automated action to be performed, the one or more processors are further responsive to the computer-executable instructions contained in the program code and operative to:
cause a prompt to be surfaced in the electronic message, the prompt selectable for sending a meeting invite to a party associated with the meeting.

11. The system of claim 8, wherein the at least one parameter comprises one or more of: a potential attendee of the meeting a meeting type for the meeting, a duration of the meeting, a location where the meeting is to take place, a time zone associated with the meeting, and a time when the meeting is to take place.

12. The system of claim 8, wherein the fine-grained processing model comprises a conditional random field model.

13. The system of claim 8, wherein the conditional random field model comprises long short-term memory feature extraction.

14. A computer-readable storage device comprising executable instructions that, when executed by one or more processors, assists with scheduling a meeting, the computer-readable storage device including instructions executable by the one or more processors for:
receiving, by a digital assistant service, an electronic message comprising a plurality of sentences;
extracting, by the digital assistant service, each of the plurality of sentences from the electronic message;
transforming, by the digital assistant service, each word in each of the plurality of sentences into word encodings utilizing a course-grained processing model comprising a hierarchical attention model;
generating, by the digital assistant service, from the word encodings, sentence vectors for each of the plurality of sentences utilizing the course-grained processing model;
identifying, by the digital assistant service utilizing the coarse-grained processing model, a first sentence and a second sentence of the plurality of sentences that are relevant to a schedule meeting intent based on the first sentence having a first vector encoding score above a threshold value and the second sentence having a second vector encoding score above the threshold value;
filtering, by the digital assistant service, a third sentence of the plurality of sentences from further processing based on the third sentence having a third vector encoding score below the threshold value;
identifying, by the digital assistant service utilizing a fine-grained processing model, a subset of words in the first sentence and the second sentence that are potentially relevant to scheduling of the meeting based on relating to at least one meeting parameter;
splitting, by the digital assistant service utilizing the fine-grained processing model, the subset of words into a first group comprising words from the subset of words that are above a meeting relevance threshold value, and a second group comprising words from the subset of words that are below a meeting relevance threshold value; and
causing, by the digital assistant service, an automated action associated with scheduling the meeting to be performed, wherein the automated action includes at least one meeting parameter from one of the words of the first group of words.

15. The computer-readable storage device of claim 14, wherein in causing the automated action to be performed, the instructions are further executable by the one or more processors for:
causing an automated message for scheduling the meeting to be sent to a party associated with the meeting.

16. The computer-readable storage device of claim 14, wherein in causing the automated action to be performed, the instructions are further executable by the one or more processors for:

causing a prompt to be surfaced in the electronic message, the prompt selectable for sending a meeting invite to a party associated with the meeting.

17. The computer-readable storage device of claim 14, wherein the at least one parameter comprises one or more of: a potential attendee of the meeting, a meeting type for the meeting, a duration of the meeting, a location where the meeting is to take place, a time zone associated with the meeting, and a time when the meeting is to take place.

18. The computer-readable storage device of claim 14, wherein the fine-grained processing model comprises a conditional random field model.

19. The computer-readable storage device of claim 18, wherein the conditional random field model comprises long short-term memory feature extraction.

20. The computer-readable storage device of claim 14, wherein the fine-grained processing model comprises at least one of: a topic detection clustering model; a statistical Markov model; a supervised learning model; a decision tree; a deep neural network model; a general sequence-to-sequence model; a generative model; a recurrent neural network model; and a latent variable graphical model.

* * * * *